United States Patent [19]

Krc

[11] 3,861,874
[45] Jan. 21, 1975

[54] TOTAL RECOVERY THERMAL ANALYSIS SYSTEM

[75] Inventor: Alfred E. Krc, La Porte, Tex.

[73] Assignee: Shell Oil Company, Houston, Tex.

[22] Filed: Mar. 7, 1973

[21] Appl. No.: 338,707

[52] U.S. Cl. .................... 23/230 PC, 23/253 PC
[51] Int. Cl. ............................................ G01n 31/12
[58] Field of Search .................... 23/230 PC, 253 PC

[56] References Cited
UNITED STATES PATENTS
3,527,567  9/1970  Philyaw et al. ............. 23/230 PC
3,661,527  5/1972  Eggertsen et al. ........... 23/230 PC OTHER PUBLICATIONS
Rogers et al., Anal. Chem., 32, 672–678, (1960).

*Primary Examiner*—Robert M. Reese
*Attorney, Agent, or Firm*—John M. Duncan; Ronald R. Reper

[57] ABSTRACT

A total recovery thermal analysis method and apparatus for rapidly determining quantitative yield versus boiling point temperature information up to about 1,600°F for carbon-containing materials in a micro sample which includes both volatile and nonvolatile components. A pre-determined flow rate of carrier gas is passed over a sample which being heated at a pre-determined rate. Any volatile material evolved from the sample is then combusted to carbon dioxide which is measured in a detector. The sample temperatures and detector output are correlated and converted to boiling point curves by calibrating the apparatus with compounds of known boiling point.

14 Claims, 6 Drawing Figures

TOTAL RECOVERY THERMAL ANALYSIS SYSTEM

BACKGROUND OF THE INVENTION

The invention relates to a thermal analysis method and apparatus for determining boiling point curves for carbon-containing materials having both volatile and non-volatile components therein, including a direct determination of the non-volatile materials present, thereby providing a total recovery thermal analysis system (TRTAS).

In many instances it is important to determine the boiling point curves of carbon-containing materials. Some heavy crude and residual oils contain high boiling and non-volatile carbonaceous materials which are difficult to measure by conventional distillation methods because they would be decomposed before they were vaporized, especially at atmospheric pressure. Decomposition of high boiling hydrocarbons begins at about 700°F so that many residual oils cannot be distilled at atmospheric pressure. In some cases both vacuum and steam are used.

A much used method of determining boiling point curves for crude and residual oils is the vacuum Engler-type distillation. This method is not very accurate above 1,000°F. Thermal cracking of the sample starts at 650°F kettle temperature, at which point the distillation must be stopped. The unvaporized residue is then determined by weighing. A major disadvantage of this method is the analysis time requirement of about 10 hours.

An apparatus and method for determination of pyrolysis curves of organic and inorganic compounds are described by Rogers, et al., "Pyrolysis as an Analytical Tool" in Analytical Chemistry, Vol. 32, No. 6, May 1960, pp. 672–678. This method measures the volatile fragments produced as a function of temperature rather than continually weighing the residue. However, no provision is made for measuring the non-volatile components present in the sample. Furthermore, there is no indication that the pyrolysis curves obtained can be converted into true boiling point curves which closely approximate a true boiling point analysis of volatile carbon-containing materials.

A method and apparatus for analyzing organic samples containing both volatile and non-volatile materials is described by Philyaw et al. in U.S. Pat. No. 3,527,567. This method involves passing the sample to be analyzed into a gas-liquid chromatograph column. Volatile materials in the sample are vaporized by temperature programming the chromatograph column to elute the volatile fractions retained therein which are then converted to carbon dioxide and measured by a thermal conductivity detector. After the volatile components are removed from the column, residual and non-volatile components are determined by adding oxygen to oxidize them to carbon dioxide. Unfortunately, this method is limited to a maximum boiling point temperature of about 1,150°F because material boiling higher than this cannot be eluted or back-flushed from the column without excessive "bleeding" of the column stationary phase due to vaporization and/or decomposition at higher temperatures.

Another method for determining the thermal stability, vapor pressure, volatile content of samples and hydrocarbon yield versus temperature pattern of oil shales and organic-bearing samples is described by Eggertsen in U.S. Pat. No. 3,574,549. The instrument consists of a pyrolyzer combined directly with a sensitive closely-coupled flame ionization detector operated at a high temperature. By close-coupling the detector to the pyrolyzer condensation of high boiling volatile components is avoided. This method is only suitable for volatile components and leaves the non-volatiles unmeasured except by weighing.

Another method and apparatus which includes distillation analysis of samples is described by Eggertsen et al. in U.S. Pat. No. 3,661,527. This method, like the earlier described Eggertsen patent, has no provision for measuring non-volatile components. This method extends the boiling point curve up to about 700°C (i.e., about 1,290°F). A rather complicated calculation procedure is required for converting vapor pressures to their normal boiling points.

SUMMARY OF THE INVENTION

A total recovery thermal analysis system (TRTAS) is provided for analyzing the carbon-containing material for both volatile and non-volatile components in a micro sample to obtain quantitative yield versus temperature information up to about 1,600°F. The sample is placed in a holder inside a hollow injection port tube which is located inside a furnace. Inert carrier gas is passed over the sample at a pre-determined flow rate and the sample is heated at a pre-determined rate until most of the volatile components have been removed. The carbon-containing materials in the sample are passed into a combustion tube and converted to carbon dioxide ($CO_2$), then to a detector to measure the $CO_2$ content. Then the sample temperature is increased to about 1,290°F and oxygen-containing gas is added to combust any remaining non-volatile components. The detector response is converted to boiling point temperature by calibrating the apparatus with compounds of known boiling point and the magnitude of the response is related to the quantitative yield of carbon containing materials.

DESCRIPTION OF A PREFERRED EMBODIMENT

Figure 1:
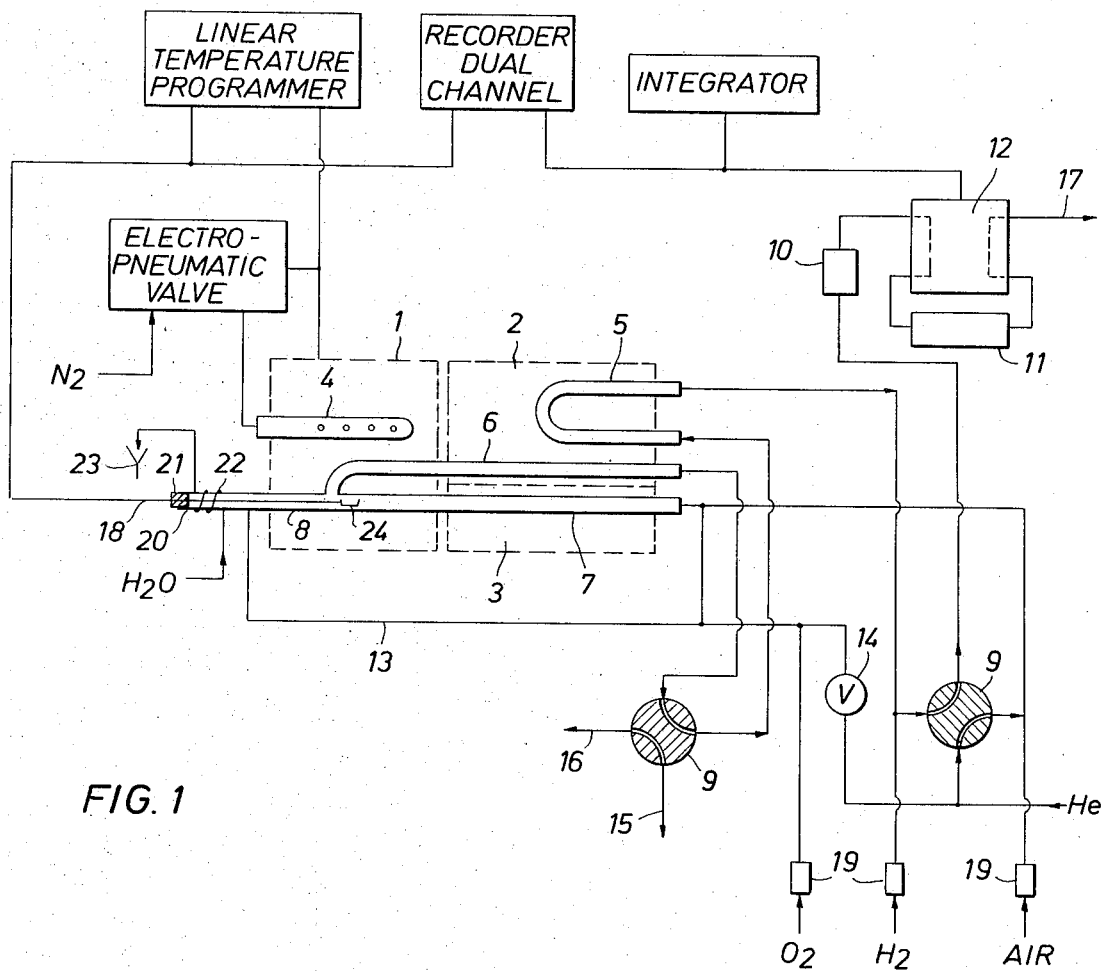
FIG. 1 is a block diagram of one embodiment of the total recovery thermal analysis system of this invention.
Figure 2:
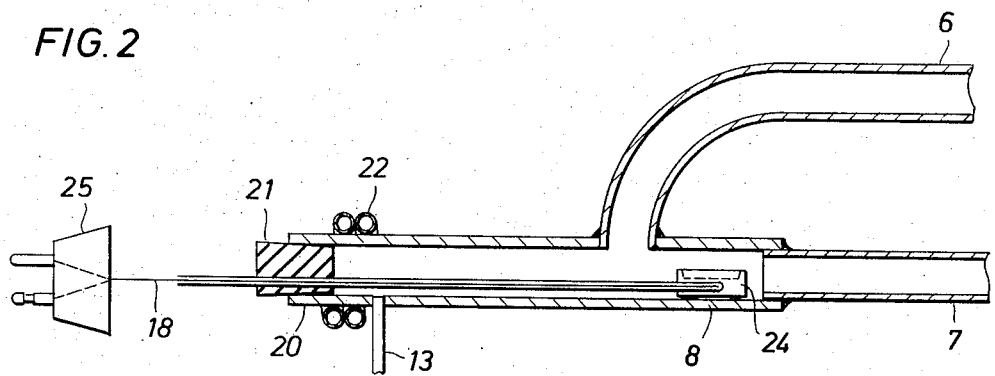
FIG. 2 shows a detailed section of a portion of the block diagram of FIG. 1.

Referring now to FIGS. 1 and 2, a block diagram of a preferred embodiment of the total recovery thermal analysis system (TRTAS) is shown. The apparatus for carrying out the invention consists of three furnaces including an injection port furnace 1 connected to a linear temperature programmer capable of increasing the temperature at a uniform controlled rate to about 1,290°F (700°C); a combustion tube furnace 2 capable of maintaining a temperature of about 1,290°F (700°C); and a carrier gas preheater furnace 3 capable of maintaining a temperature of about 750°F (400°C). To provide a smooth temperature rise in the injection port furnace 1 a cooling gas delivery tube 4 is placed inside the furnace to provide cooling nitrogen or air as needed to prevent local overheating. Cooling gas flow is preferably controlled by an electropneumatic valve operating in conjunction with the linear temperature programmer.

Inside the combustion tube furnace 2 is located an oxygen scrubber 5 for removing any excess oxygen from the combustion products and a combustion tube 6, preferably containing a copper oxide catalyst capable of combusting small amounts of carbon-containing material from the sample being analyzed. The carrier gas preheater furnace 3 contains a preheater tube 7 for heating the carrier gas which is passed over the sample being analyzed. The injection port furnace 1 contains an injection port tube 8 capable of receiving the sample to be analyzed. Gases passing from the combustion tube 6 are routed through 4-Port valves 9 and oxygen scrubber 5 to a dryer 10 where water is removed before passing the gas into a thermal conductivity cell detector 12. For the detector used it was necessary to remove both oxygen and water to obtain accurate $CO_2$ measurements. The detector contains a $CO_2$ scrubber 11 for removing $CO_2$ from the combustion gases to provide a $CO_2$ free background gas for comparison with the stream to be analyzed. Gases from the detector 12 are vented to the atmosphere via line 17. A helium slip stream is provided via line 13 and regulating valve 14 to sample injection port tube 8 to insure that this otherwise stagnant portion of the tube is swept free of any of the sample being analyzed.

The sample to be analyzed is introduced into injection port tube 8 in a sample holder 24 which is suitably constructed of a stainless steel and preferably has operatively engaged thereto a thermocouple 18 for recording sample temperature. This assembly permits accurate measurement of the sample temperature which is transmitted to linear temperature programmer and recorder for subsequent use in determining the sample boiling point. This sample holder assembly is inserted into the sample tube 8 via injection port inlet 20 and is suitably held firmly in place by means of a septum 21. Preferably cooling water is supplied to a cooling coil 22, to a drain 23 to protect the septum 21 from overheating.

Inert carrier gas is passed through preheater tube 7 and line 13 over the sample holder 24 at a predetermined flow rate and the sample is heated at a predetermined rate by furnace 1 until most of the volatile components have been removed. Then the sample temperature is increased to about 1,290°F and oxygen-containing gas is added to the carrier gas from double end shut off quick connect 19 to combust any remaining non-volatile components.

Lines 15 and 16 connected to a 4-Port valve 9 are for venting hydrogen and air, respectively, from the system during certain stages of the analysis. After each analysis it is necessary to reoxidize the copper oxide in the combustion tube 6 and to reduce the metallic copper in the oxygen scrubber 5.

To reduce the metallic copper, the 4-Port valves 9 are rotated so that hydrogen is passed through a double end shutoff quick-connect 19 into oxygen scrubber 5 and out line 15.

To reoxidize the copper oxide the 4-Port valves 9 are rotated so that air can be passed through a doubleend shutoff quick-connect 19 into preheater tube 7, through combustion tube 6 and out line 16.

Turning now to FIG. 2, the portion of the injection port tube 8 which contains the sample holder 24 is shown in greater detail. The sample holder 24 is located so that gases entering tube 8 via preheater tube 7 are passed over the sample where vaporized and/or decomposed sample is swept along with the carrier gas to combustion tube 6 where the carbon-containing materials are converted to $CO_2$, suitably by means of a combustion catalyst, e.g., copper oxide filings packed in the combustion tube 6.

The carrier gas flow rate is not critical and can be varied from about 10 ml/minute to about 100 ml/minute. It is necessary that a standard rate be chosen so that the detector responds at the same time for unknown samples as for the pure compounds with known boiling points, which are used to calibrate the system. A standard gas flow rate of 30 ml/minute was used in the examples reported herein.

The sample heating rate is not critical and can be varied from about 5°F/minute to about 100°F/minute with good results. Again, however, it is necessary to choose a standard rate to correspond with that used for the pure calibrating compounds. A standard heating rate of about 27°F/minute (15°C/minute) was used in the examples herein.

Figure 3:
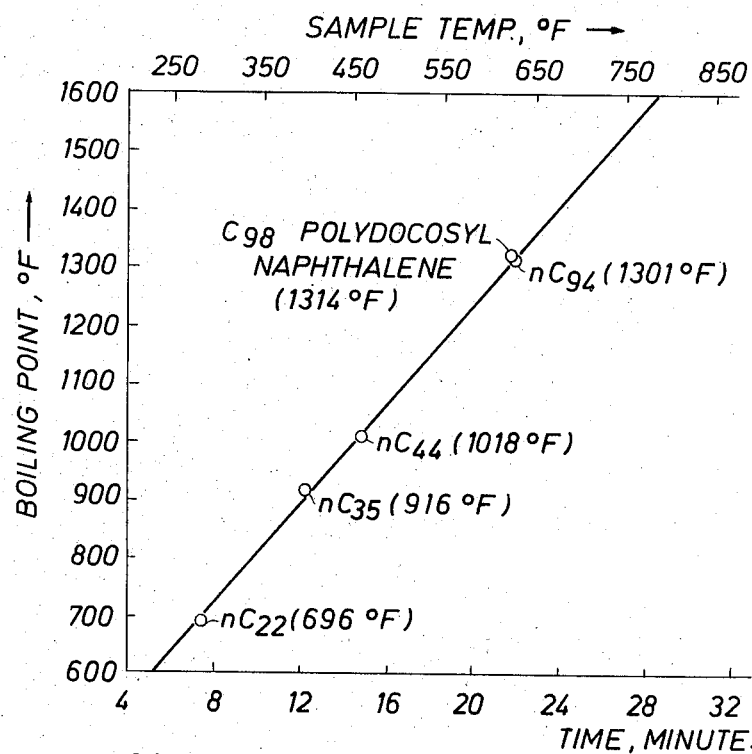
FIG. 3 is a calibration curve relating boiling points of pure compounds to sample temperature and time.

Turning now to FIG. 3, the calibration curve shows that a straight line plot of boiling point versus either sample temperature or time is obtained over a wide range of boiling points, i.e., from about 700°–1,600°F. The flowing gas passing over the sample sweeps any vaporized material to the combustion tube and detector, with the lower boiling, higher vapor pressure components being removed first. It can be seen from the figure that components boiling up to 1,600°F can be vaporized at the relatively low temperaature of about 770°F in the relatively short time of about 28 minutes under the standard conditions chosen.

The method and apparatus will now be more fully described by the following examples.

EXAMPLE I

The apparatus was calibrated by introducing several pure compounds of known boiling point into the sample holder and measuring the sample temperature and the time required to vaporize the sample from the holder container while operating under "standard" conditions.

The injection port furnace was furnished power from a linear temperature programmer. A programmed heating rate of 15°C/minute (27°F/minute) was selected as a standard. Helium carrier gas was passed over the sample at a standard flow rate of 30 ml/minute. Cooling nitrogen (or air) was supplied to the injection port furnace as required to prevent overheating of the furnace and to provide a smooth reproducible temperature rise.

The time and sample temperature required to obtain a detector response for each pure compound is plotted against the known boiling point of the compound in the calibration curve of FIG. 3. Once established, a calibration curve permits a very rapid determination of the boiling points of unknown volatile carbon-containing materials.

EXAMPLE 2

Figure 4:
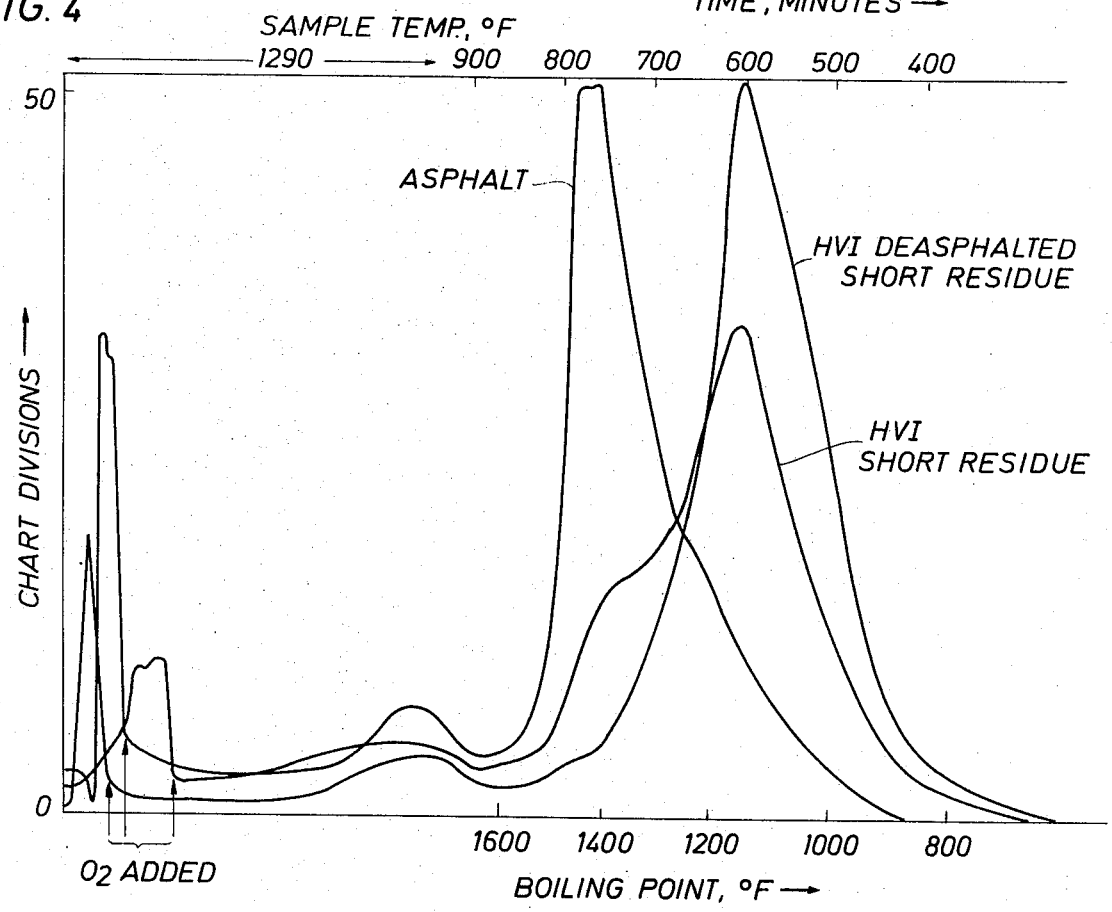
FIG. 4 shows superimposed detector response curves for samples of HVI de-asphalted short residue, HVI short residue and asphalt, obtained using the apparatus of FIG. 1.
Figure 5:
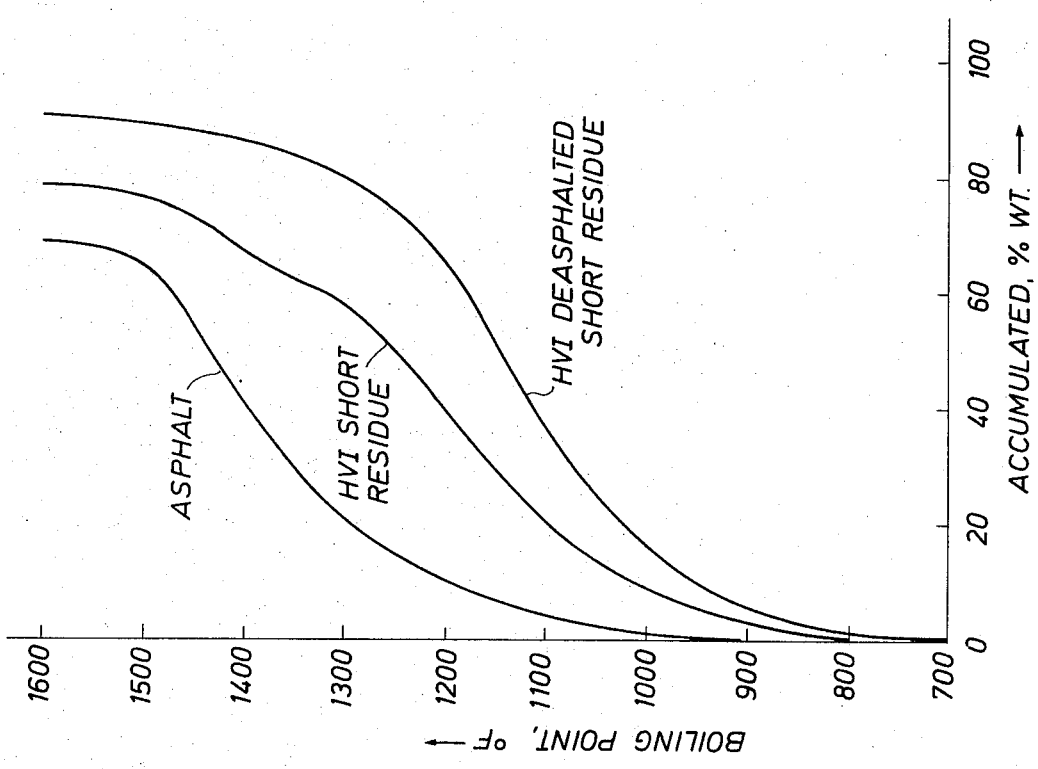

The ability to determine boiling point data for heavy petroleum fractions is of value for both design and operation of commercial units and for planning and understanding research experiments. This example demonstrates the utility of the method and apparatus as applied to the feed and products of a propane deasphalting unit. Graphs of detector response versus sample temperature for a high viscosity index (HVI) short residue, for the asphalt separated from this material, and for the HVI deasphalted short residue are shown in FIG. 4. This figure represents three super-imposed recorder printouts of test results with an indication of boiling point shown on the lower scale. The final peak was obtained at about 1,290°F (700°C) by adding oxygen to the carrier gas to combust any organic material remaining in the sample. These data can be readily converted to true boiling point curves (Boiling Point versus Accumulated %wt) by integrating the area under the curves to determine the yield of any particular high boiling component. The results of such a conversion are shown in FIG. 5.

EXAMPLE 3

Figure 6:
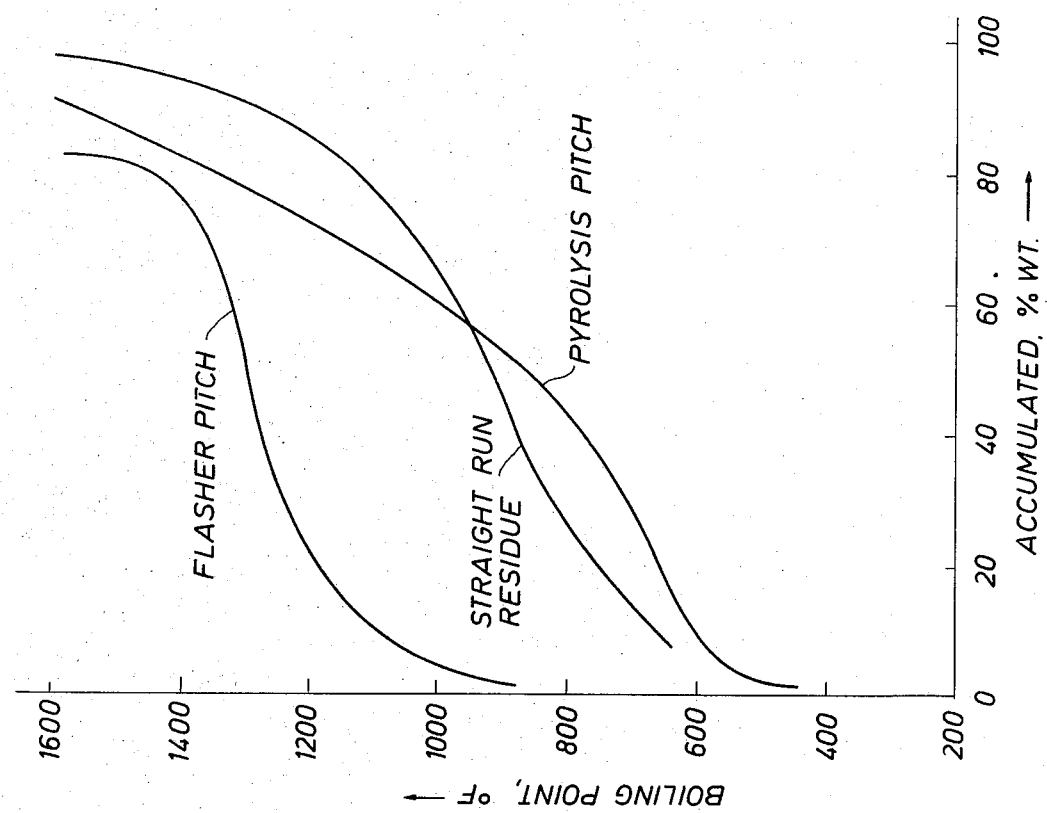
FIGS. 5 and 6 show yield versus boiling point data for the three samples of FIG. 4 and for flasher pitch, straight run residue and pyrolysis pitch, respectively, obtained using the apparatus of FIG. 1.

Reproducible boiling point data have been obtained with TRTAS for a variety of petroleum streams. In FIG. 6 boiling point data obtained by the TRTAS method are shown for a flasher pitch, a pyrolysis pitch, and a straight run residue.

The data shown are in good agreement with corresponding data obtained by true boiling point-gas liquid chromatography (TBP-GLC) and by thermal analysis flame ionization detector (TAFID) and vacuum Engler-type methods up to the limits of each technique. The TBP-GLC method has an upper boiling point limit of about 1,000°F, the TAFID method has an upper limit of about 1,350°F, while the vacuum Engler has an upper limit of about 900°F.

What is claimed is:

1. A total recovery thermal method for analyzing a micro sample of carbon-containing materials to obtain quantitative yield versus boiling point temperature information said method comprising:

placing the sample in a sample holder inside a hollow injection port tube located in a furnace, said tube having an opening for inserting said sample and having an inlet and outlet for passage of gas;

passing an inert carrier gas over said sample at a predetermined flow rate and heating said sample at a pre-determined rate until the sample temperature is about 1,290°F and then adding oxygen-containing gas to combust any remaining components;

discharging the total flow of gas from the injection port tube to a combustion tube to convert said carbon-containing material to carbon dioxide;

discharging the flow of gas from the combustion tube to a detector for measuring the carbon dioxide content of said gas;

determining the detector response as a function of sample temperature by suitable recording means;

converting the detector response to boiling point temperatures by calibrating the detector with compounds of known boiling point; and relating the magnitude of the response to the quantitative yield of carbon-containing materials.

2. The method of claim 1 wherein the areas of the detector response recording are integrated to obtain the yields of carbon-containing materials at various boiling points.

3. The method of claim 1 wherein the carbon-containing material is converted to carbon dioxide by passing the total gas flow over heated copper oxide.

4. The method of claim 1 wherein the inert gas is helium.

5. The method of claim 1 wherein heating of the sample is at a rate from about 5°F/minute to about 100°F/minute.

6. The method of claim 1 wherein the carrier gas flow rate is from about 10 ml/minute to about 100 ml/minute.

7. The method of claim 1 wherein oxygen and water is removed from gas discharged from the combustion tube before passing into the detector.

8. The method of claim 7 wherein oxygen removal comprises passing said gas over heated metallic copper.

9. An apparatus for conducting a thermal analysis of carbon-containing materials in a sample to obtain quantitative yield versus boiling point temperature information, said apparatus comprising:

a hollow injection port tube mounted in a furnace and adapted to receive a sample holder capable of containing a micro sample of carbon-containing material, said injection port tube having an inlet opening and an outlet opening for establishing a gas flow therethrough, said sample holder having temperature measuring means operatively engaging said sample holder for measuring the temperature thereof and a linear temperature programmer capable of increasing the temperature of said injection port at a uniformed controlled rate to about 1,290°F;

carrier gas inlet means in communication with a supply of carrier gas and with the injection port for flowing carrier gas over the sample holder;

flow control operatively engaging the carrier gas inlet means for establishing a known inert gas flow over said sample in said tube;

oxygen-injecting means communicating with said injection port tube for combusting carbon-containing material remaining in said sample;

heating means operatively engaging said carrier gas inlet means for reproducibly heating the carrier gas before passing said gas over said sample;

a combustion tube having heating means and communicating with the outlet of said injection port tube;

detector means communicating with said combustion tube for measuring the carbon dioxide content of the gas from said combustion tube; and recorder means operatively engaging the detector means and temperature measuring means for recording the detector response and the corresponding temperature of the sample being heated.

10. The apparatus of claim 9 including a linear temperature programmer operatively engaging combustion tube heating means for controlling the pre-determined sample heating rate.

11. The apparatus of claim 9 including means for cooling the sample inlet of said injection port tube and means for purging gases from said tube.

12. The apparatus of claim 9 wherein the combustion tube contains copper oxide.

13. The apparatus of claim 9 wherein said detector means is a thermal conductivity cell.

14. The apparatus of claim 13 including oxygen-removal and drying means operatively engaging the gas from said combustion tube prior to flow of the gas to the thermal conductivity cell.

* * * * *